US009747729B2

(12) United States Patent
Berkobin et al.

(10) Patent No.: US 9,747,729 B2
(45) Date of Patent: Aug. 29, 2017

(54) METHODS, SYSTEMS, AND APPARATUSES FOR CONSUMER TELEMATICS

(75) Inventors: Eric Berkobin, Woodstock, GA (US); Frederick T. Blumer, Atlanta, GA (US)

(73) Assignee: Verizon Telematics Inc., Atlanta, GA (US)

(*) Notice: Subject to any disclaimer, the term of this patent is extended or adjusted under 35 U.S.C. 154(b) by 1196 days.

(21) Appl. No.: 12/131,148

(22) Filed: Jun. 2, 2008

(65) Prior Publication Data

US 2008/0319665 A1 Dec. 25, 2008

Related U.S. Application Data

(60) Provisional application No. 60/941,154, filed on May 31, 2007.

(51) Int. Cl.

*G01M 17/00* (2006.01)
*G06F 7/00* (2006.01)
*G07C 5/00* (2006.01)
*G07C 5/08* (2006.01)

(52) U.S. Cl.

CPC ............. *G07C 5/008* (2013.01); *G07C 5/085* (2013.01)

(58) Field of Classification Search

USPC ............................ 701/31.5, 32.3, 32.4, 33.2

See application file for complete search history.

(56) References Cited

U.S. PATENT DOCUMENTS 4,258,421 A * 3/1981 Juhasz .................. G07C 5/085 340/870.16
5,223,844 A * 6/1993 Mansell .................. B60R 25/04 340/426.19
5,400,018 A * 3/1995 Scholl ...................... G08G 1/20 340/10.3
5,729,452 A * 3/1998 Smith ................. G01M 15/102 700/31
5,754,965 A * 5/1998 Hagenbuch ............ G07C 5/085 340/439
5,758,300 A * 5/1998 Abe ...................... G01M 15/05 455/424
5,825,286 A * 10/1998 Coulthard ............ B60C 23/009 340/442
5,835,871 A * 11/1998 Smith ................. G01M 15/102 701/29.1
5,884,202 A * 3/1999 Arjomand ............ G01M 15/05 340/12.54
6,069,570 A * 5/2000 Herring ................... G01S 1/045 340/10.41
6,076,028 A * 6/2000 Donnelly ............. B60R 21/013 701/45
6,154,658 A * 11/2000 Caci ....................... H04M 11/04 455/466
6,166,627 A * 12/2000 Reeley ................. B60R 25/102 340/426.18
6,225,898 B1 * 5/2001 Kamiya ................. G07C 5/008 340/10.1

(Continued)

*Primary Examiner* — Bhavesh V Amin

(57) ABSTRACT

Provided are methods, systems, and apparatuses for after-market telematics. In one aspect, provided is an apparatus comprising a telematics control unit configured for consumer installation, consumer use, and the like. The apparatus can be installed in a vehicle. In another aspect, provided are systems and methods for operation of the apparatus.

20 Claims, 9 Drawing Sheets

(56) References Cited

U.S. PATENT DOCUMENTS

| | | | | |
|---|---|---|---|---|
| 6,282,491 | B1 * | 8/2001 | Bochmann | G01C 21/26 342/357.4 |
| 6,295,492 | B1 * | 9/2001 | Lang | G05B 15/02 340/425.5 |
| 6,330,499 | B1 * | 12/2001 | Chou | G07C 5/008 701/31.4 |
| 6,356,823 | B1 * | 3/2002 | Iannotti | H04L 12/40032 369/21 |
| 6,362,730 | B2 * | 3/2002 | Razav | G05B 15/02 340/438 |
| 6,430,485 | B1 * | 8/2002 | Hullinger | H04L 69/18 340/870.16 |
| 6,434,458 | B1 * | 8/2002 | Laguer-Diaz | B61L 3/125 701/31.4 |
| 6,459,969 | B1 * | 10/2002 | Bates | G07C 5/006 123/436 |
| 6,505,106 | B1 * | 1/2003 | Lawrence | G01M 15/05 342/357.31 |
| 6,535,112 | B1 * | 3/2003 | Rothschink | G07C 5/008 324/402 |
| 6,553,308 | B1 * | 4/2003 | Uhlmann | B61L 29/24 340/988 |
| 6,587,768 | B2 * | 7/2003 | Chene | G07C 5/006 701/33.2 |
| 6,611,740 | B2 * | 8/2003 | Lowrey | G01M 15/04 379/1.01 |
| 6,636,790 | B1 * | 10/2003 | Lightner | G01M 15/102 701/31.4 |
| 6,687,586 | B2 * | 2/2004 | Hardtle | G07C 5/008 477/110 |
| 6,732,031 | B1 * | 5/2004 | Lightner | G01M 15/102 701/31.4 |
| 6,751,475 | B1 * | 6/2004 | Holmes | H04M 1/6091 455/406 |
| 6,792,352 | B1 * | 9/2004 | Hoffmann | B60R 25/102 307/10.1 |
| 6,871,067 | B2 * | 3/2005 | Clark | G08G 1/096716 455/41.2 |
| 6,871,121 | B2 * | 3/2005 | Tomson | G01C 21/36 701/1 |
| 6,957,133 | B1 * | 10/2005 | Hunt | B60R 25/102 701/32.4 |
| 7,003,289 | B1 * | 2/2006 | Kolls | G08G 1/205 455/422.1 |
| 7,116,216 | B2 * | 10/2006 | Andreasen | B60K 35/00 340/438 |
| 7,209,813 | B2 * | 4/2007 | Namaky | H04L 67/125 701/33.2 |
| 7,225,065 | B1 * | 5/2007 | Hunt | B60R 16/0207 701/33.2 |
| 7,228,211 | B1 * | 6/2007 | Lowrey | G07C 5/008 701/31.5 |
| 7,271,716 | B2 * | 9/2007 | Nou | G08B 13/19647 340/438 |
| 7,317,975 | B2 * | 1/2008 | Woolford | G06F 1/3203 701/29.3 |
| 7,363,149 | B2 * | 4/2008 | Klausner | G01C 21/26 701/32.7 |
| 7,463,959 | B2 * | 12/2008 | Namaky | H04L 67/125 701/32.8 |
| 7,627,406 | B2 * | 12/2009 | Wang | G01M 17/00 340/539.24 |
| 7,904,219 | B1 * | 3/2011 | Lowrey | G01C 21/26 701/32.3 |
| 7,920,944 | B2 * | 4/2011 | Gould | G07C 5/008 340/425.5 |
| 8,355,837 | B2 * | 1/2013 | Avery | G01R 31/007 701/29.1 |
| 8,880,274 | B2 * | 11/2014 | Chenn | G07C 5/008 701/2 |
| 2002/0003571 | A1 * | 1/2002 | Schofield | B60C 23/00 348/148 |
| 2002/0049535 | A1 * | 4/2002 | Rigo | G01C 21/3629 701/431 |
| 2002/0103622 | A1 * | 8/2002 | Burge | G06F 19/327 702/183 |
| 2002/0173889 | A1 * | 11/2002 | Odinak | B60R 11/02 701/36 |
| 2003/0083079 | A1 * | 5/2003 | Clark | G08G 1/096716 455/466 |
| 2003/0171111 | A1 * | 9/2003 | Clark | H04L 69/329 455/414.1 |
| 2004/0010358 | A1 * | 1/2004 | Oesterling | B60R 16/0231 701/49 |
| 2004/0044454 | A1 * | 3/2004 | Ross | B60R 16/0231 701/36 |
| 2004/0068350 | A1 * | 4/2004 | Tomson | G01C 21/36 701/1 |
| 2004/0111195 | A1 * | 6/2004 | Vries | G01C 21/20 701/21 |
| 2004/0227523 | A1 * | 11/2004 | Namaky | H04L 67/125 324/537 |
| 2005/0027438 | A1 * | 2/2005 | Rockett | G08G 1/205 701/532 |
| 2005/0049785 | A1 * | 3/2005 | Vergin | G08G 1/0969 701/533 |
| 2005/0065711 | A1 * | 3/2005 | Dahlgren | G01C 21/26 701/117 |
| 2005/0065779 | A1 | 3/2005 | Odinak | |
| 2005/0068174 | A1 * | 3/2005 | Oesterling | B60R 16/0234 340/539.24 |
| 2005/0075095 | A1 * | 4/2005 | Dillon | G07C 5/008 455/412.2 |
| 2005/0080606 | A1 * | 4/2005 | Ampunan | G01M 17/007 703/8 |
| 2005/0192727 | A1 * | 9/2005 | Shostak | B60C 11/24 701/37 |
| 2005/0200479 | A1 * | 9/2005 | James | G08G 1/205 340/539.18 |
| 2005/0245272 | A1 * | 11/2005 | Spaur | H04L 12/4625 455/456.3 |
| 2005/0273218 | A1 * | 12/2005 | Breed | B60C 11/24 701/2 |
| 2006/0041373 | A1 * | 2/2006 | Rowe | G01C 21/3608 701/532 |
| 2006/0101311 | A1 * | 5/2006 | Lipscomb | G07C 5/008 714/47.1 |
| 2006/0212179 | A1 * | 9/2006 | Philips | H04W 4/008 701/1 |
| 2007/0005201 | A1 * | 1/2007 | Chenn | G07C 5/008 701/31.5 |
| 2007/0152503 | A1 * | 7/2007 | Kowalick | H01R 13/6397 307/10.1 |
| 2007/0156311 | A1 * | 7/2007 | Elcock | G07C 5/008 701/31.4 |
| 2008/0119981 | A1 * | 5/2008 | Chen | G05B 23/0267 701/31.4 |
| 2008/0319665 | A1 * | 12/2008 | Berkobin | G07C 5/008 701/469 |
| 2009/0276115 | A1 * | 11/2009 | Chen | G07C 5/008 701/29.6 |
| 2010/0070107 | A1 * | 3/2010 | Berkobin | G07C 5/008 701/1 |

* cited by examiner

METHODS, SYSTEMS, AND APPARATUSES FOR CONSUMER TELEMATICS

CROSS REFERENCE TO RELATED APPLICATION

This application claims priority to U.S. Provisional Application No. 60/941,154 filed May 31, 2007, herein incorporated by reference in its entirety.

SUMMARY

Provided are methods, systems, and apparatuses for aftermarket telematics. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
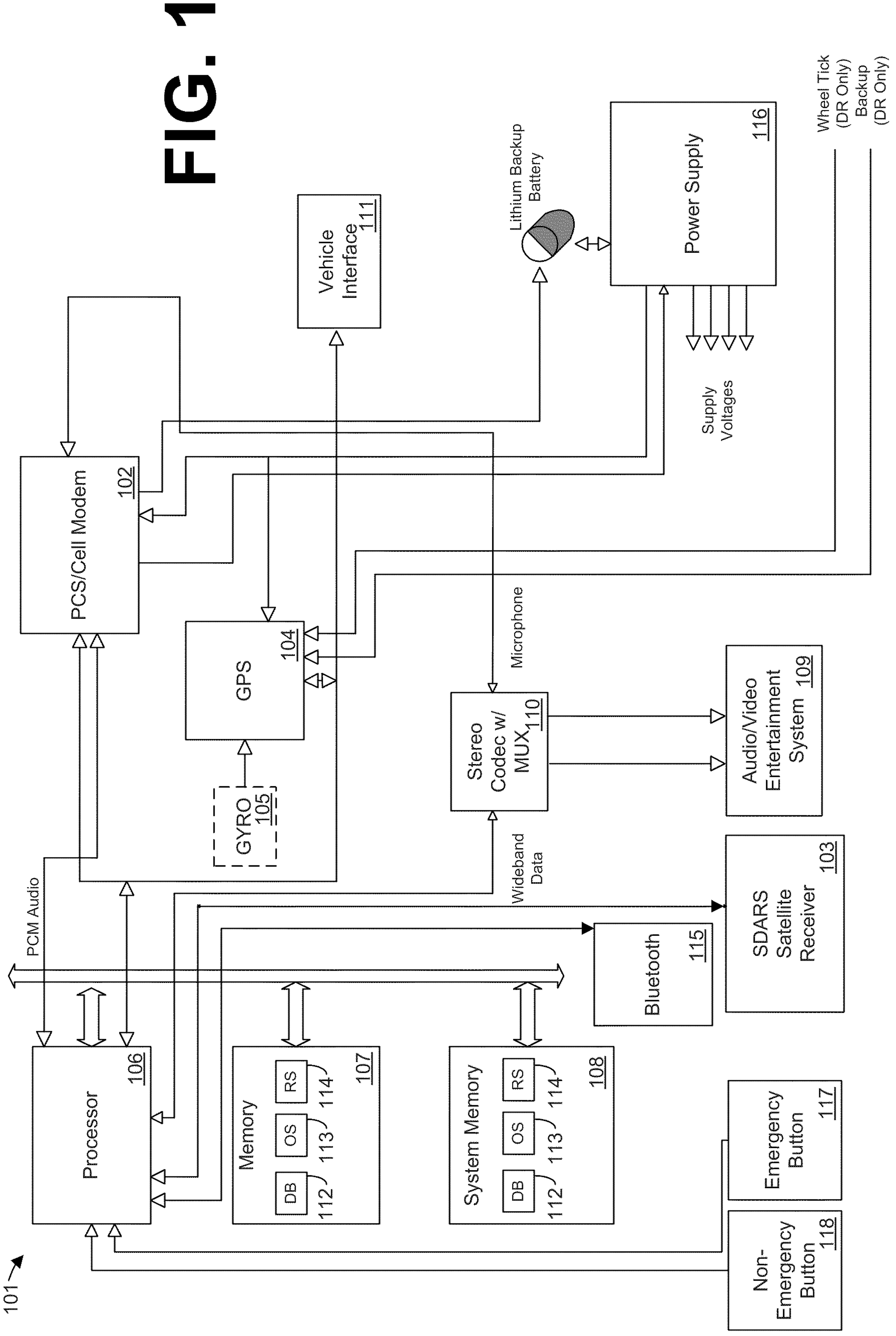
FIG. 1 is a schematic of an exemplary apparatus.

Before the present methods, systems, and apparatuses are disclosed and described, it is to be understood that the methods, systems, and apparatuses are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

The present methods, systems, and apparatuses may be understood more readily by reference to the following detailed description of preferred embodiments and the Examples included therein and to the Figures and their previous and following description.

In one aspect, provided is an apparatus comprising a telematics control unit configured for consumer installation, consumer use, and the like. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. The apparatus 101, is also referred to herein as the VTU 101.

In an aspect, all components of the telematics unit can be contained within a single box and controlled with a single core processing subsystem. In another aspect, the components can be distributed throughout a vehicle. Each of the components of the apparatus can be separate subsystems of the vehicle, for example, a communications component such as a SDARS, or other satellite receiver, can be coupled with an entertainment system of the vehicle.

An exemplary apparatus 101 is illustrated in FIG. 1. This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 101 can comprise one or more communications components. Apparatus 101 illustrates communications components (modules) PCS/Cell Modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communications can include, but is not limited to GPRS, EDGE, UMTS, 1×RTT or EV-DO. The PCS/Cell Modem 102 can be a Wi-Fi or mobile WIMAX implementation that can support operation on both licensed and unlicensed wireless frequencies. The apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within the apparatus 101. Updating can be requested by the apparatus 101, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternately, the GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets and tunnels.

In an aspect, the GPS receiver 104 can activate on ignition or start of motion. The GPS receiver 104 can go into idle on ignition off or after ten minutes without motion. Time to first fix can be <45 s 90% of the time. For example, this can be achieved either through chipset selection or periodic wake-up.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission can utilize PCS/Cell Modem 102 to transmit the data. The data can be routed through the Internet where it can be accessed, displayed and manipulated.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 107, including by way of example, an operating system 113 and reporting software 114. Each of the operating system 113 and reporting software 114 (or some combination thereof) can comprise elements of the programming and the reporting software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like. The database 112 can be centralized or distributed across multiple systems.

In some aspects, data can be stored and transmitted in loss-less compressed form and the data can be tamper-proof Non-limiting examples of data that can be collected are as follows. After a connection is established the protocol being used can be stored. A timestamp can be recorded on ignition for one or more trips. Speed every second during the trip. Crash events can be stored (for example, as approximated via OBD II speed). By way of example, GPS related data that can be recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 101, and are executed by the processor 106 of the apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and reporting software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

The apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. A cable can be used to connect the vehicle interface 111 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, and the like can be used to collect data through the vehicle interface 111. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drive-train computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 101 can interface directly with a vehicle subsystem or a sensor, such as an accelerometer, gyroscope, airbag deployment computer, and the like. Data obtained from, and processed data derived from, the various vehicle systems and sensors can be transmitted to a central monitoring station via the PCS/Cell Modem 102.

Communication with a vehicle driver can be through an infotainment (radio) head (not shown) or other display device (not shown). More than one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players (such as an ipod), and the like. Audio/video entertainment subsystem 109 can be controlled remotely through, for example, a wireless remote control, voice commands, and the like.

The methods, systems, and apparatuses provided can utilize a power management scheme ensuring that a consumer's car battery is not impaired under normal operating conditions. This can include battery backup support when the vehicle is off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

The apparatus 101 can receive power from power supply 116. The power supply can have many unique features necessary for correct operation within the automotive environment. One mode is to supple a small amount of power (typically less than 100 microamps) to at least one master controller that can control all the other power buses inside of the VTU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAN activity, the processor contained within the PCS/Cellular modem 102 can control the power supply 116 to activate other functions within the VTU 101, such as GPS 104/GYRO 105, Processor 106/Memory 107 and 108, SDARS receiver 103, audio/video entertainment system 109, audio codec mux 110, and any other peripheral within the VTU 101 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-up batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such as a low power wakeup to check for network messages, but these are nonessential features to the operation of the VTU.

Normal operation can comprise, for example, the PCS/Cellular modem 102 waiting for an emergency pushbutton key-press or CAN activity. Once either is detected, the PCS/Cellular modem 102 can awaken and enable the power supply 116 as required. Shutdown can be similar wherein a first level shutdown turns off everything except the PCS/Cellular modem 102, for example. The PCS/Cellular modem 102 can maintain wireless network contact during this state of operation. The VTU 101 can operate normally in the state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a BlueTooth transceiver 115 that can be provided to interface with devices such as phones, headsets, music players, and telematics user interfaces. The apparatus can comprise one or more user inputs, such as emergency button 117 and non-emergency button 118. Emergency button 117 can be coupled to the processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to the processor 106. One or more non-emergency buttons 118 can be located in a vehicle cockpit and activated an occupant of the vehicle. Activation of the one or more non-emergency buttons 118 can cause processor 106 to initiate a voice and data connection from the vehicle to a remote call center. Data such as GPS location and occupant personal information can be transmitted to the call center. The voice connection permits two way voice communication between a vehicle occupant and a call center operator. The call center operator can provide location based services to the vehicle occupant based on the data received and the vehicle occupant's desires. For example, a button can provide a vehicle occupant with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication made through the VTU 101, text-to-speech algorithms can be used so as to convey predetermined messages in addition to or in place of a vehicle occupant speaking. This allows for communication when the vehicle occupant is unable or unwilling to communicate vocally.

In an aspect, apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Provided are methods, systems, and apparatuses that can utilize GPS capabilities and/or two-way in-vehicle data communications between an in car device and a telematics operations center. The methods, systems, and apparatuses enable a consumer to obtain the benefits of an OEM installed vehicle telematics solution without having to purchase a vehicle with an OEM installed vehicle telematics solution. A consumer can install the apparatus by, for example, plugging the apparatus into the consumer's vehicle OBD port. The self contained apparatus can then be hidden in the cockpit of the vehicle or mounted on the dashboard. The apparatus provides the consumer with many features that are only available in OEM installed units, and provides the consumer with features that are not available with OEM installed units. For example, the consumer can remove the unit and place the unit in another vehicle.

Figure 2:
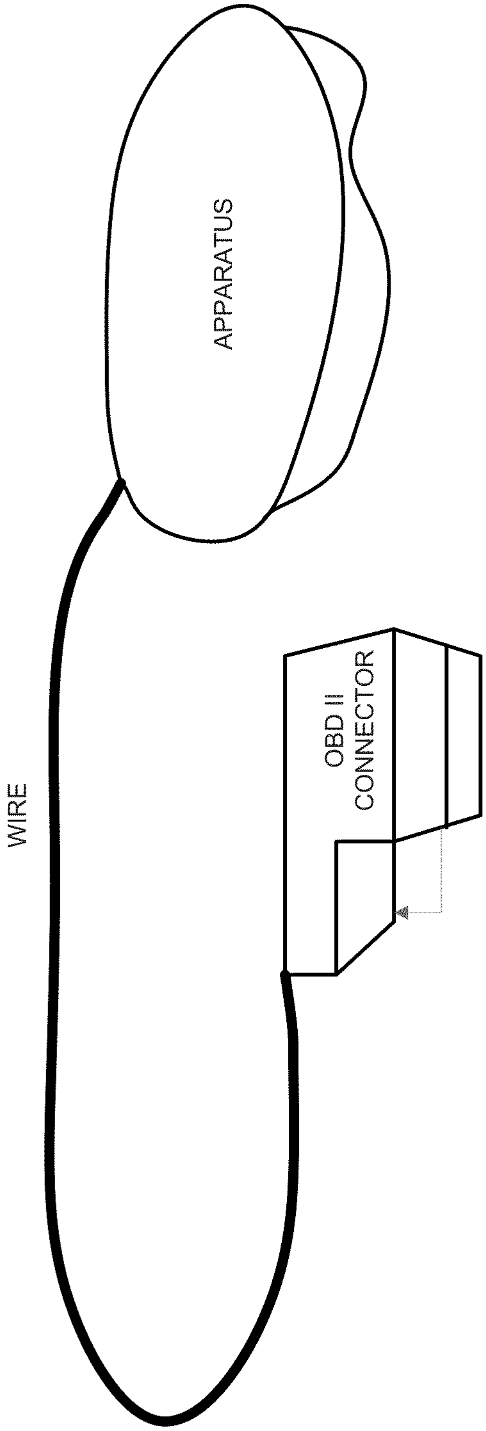
FIG. 2 is an external view of an embodiment of an exemplary apparatus.

FIG. 2 illustrates an exemplary apparatus for connection to an OBD II port. FIG. 2 illustrates an exemplary apparatus comprising one external wire for connection to the OBD II port, and a built-in antenna. In one aspect, the apparatus can be as small as possible according to customer preferences and engineering capabilities. The apparatus can be easily installed and removed by end customers. The apparatus can tolerate shock from most automobile accidents and reasonable impacts. The apparatus can have sufficient Receiver/Transmitter sensitivity/power to perform communications functions without requiring an external antenna connection.

The apparatus can comprise, for example, three LEDs (red/yellow/green): Red—wireless OK; Yellow—TBD; Green—unit OK. The apparatus can be connected to an OBD port with a cable (cable extensions available). The apparatus can be entirely contained within a "dongle" that connects to an OBD port without requiring a cable. The apparatus can be placed on dashboard or in the vehicle cockpit. The apparatus can be in a customizable package with various colored and patterned plastic "skins." The skins can be co-branded skins (action figures, etc.) or personalized skins. The apparatus can comprise an optional microphone plug-in for voice calls and/or an optional button plug-in (Emergency, Non-Emergency).

The following components can be "plug-in" options or built-in to the apparatus. Car alarms, media players, wireless LAN, interface to navigation system, cellular phones, external displays, batteries, Bluetooth, microphone, push buttons, and the like.

The methods, systems, and apparatuses provided can utilize a power management scheme ensuring that a consumer's car battery is not impaired under normal operating conditions. This can include battery backup support when the vehicle is off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable The methods, systems, and apparatuses can provide a consumer with an array of useful functionality. For example, stolen vehicle tracking, vehicle alarms, remote emissions testing, and usage based insurance (UBI).

In another embodiment, the methods, systems, and apparatuses can comprise, but are not limited to, emergency services. Such services can comprise, for example, a call-center with toll free calling for consumers using their cell-phone. A consumer can speak to a voice recognition unit or a live operator. A call-center can ping a consumer unit, establish a 3-way call with, for example, 911, wrecker services and the like. The consumer GPS location can be provided. Initiation of contact can be via a voice call and/or pressing an emergency (panic) button.

In another embodiment, the methods, systems, and apparatuses can comprise, but are not limited to, non-emergency services. Concierge-like services can be provided. Consumers can access the services via a toll-free call with their cell-phone. A call center can ping a consumer unit and provide location based services. Initiation of contact can be via a voice call and/or pressing a non-emergency (concierge) button.

In another embodiment, the methods, systems, and apparatuses can comprise, but are not limited to, remote diagnostics. Features can comprise, but are not limited to, consumer view of vehicle diagnostic information on a website; regularly scheduled push updates; push exceptions in real-time (alerts, problems, DTCs, etc.); updates via e-mail, SMS, and the like; and remote door lock/unlock (for example, via secure website or call to call center). Remote door lock/unlock can be subject to OEM CAN bus codes.

In another embodiment, the methods, systems, and apparatuses can comprise, but are not limited to, vehicle tracking, such as for children or spouses. A geo-fence can be established to, for example, keep a vehicle (and thereby the occupants) inside a geo-fence or outside a geo-fence. A vehicle can be selectively disabled if it passes through a geo-fence and/or a notification can be sent indicating that a geo-fence has been breached. Real-time or near-real-time views can be provided along with Daily/Weekly/Monthly reports. Real-time exception alerts can be pushed to a consumer device, such as a cell phone, pda, computer and the like. A geo-fence/POI can be established at a location such as a home, school, mall, and the like, and an SMS can automatically be sent to a parent, for example, upon safe arrival/departure. For example, “Hi Mom, I just arrived safely at school” or “Hi Dad, I just left school.” Multiple geo-fences/POIs can be set up with larger geo-fences/POIs. Driving characteristics can be provided, such as the driving characteristics of children to parents based on OBD & GPS data gathered by the methods, systems, and apparatuses provided. Other applications include creating a geo-fence/POI at a spouse’s workplace, church, market, school, relative’s house, and the like and automatically sending, for example, an SMS to one spouse when the other arrives safely at one of those locations. For example, “Hi, I arrived safely at work.”

An anti-fraud algorithm can detect if an apparatus is plugged into another vehicles’ OBD and adjust functionality accordingly. The apparatus can also read VIN based on availability of CAN bus OEM code. A consumer can remove the apparatus from a first vehicle and install in a second vehicle. For example, by putting the apparatus in a “Take-with” or “Away” mode. Such a mode can be enabled by the consumer via a website. The website views can automatically adapt to the “Away” mode. For example, this can allow limited use by one family member in another family member’s car. Additionally, the consumer can take his/her unit on a trip, plug into rental car or borrowed vehicle. This allows others, such as a family, to know where the consumer is while away. The consumer can still make use of call-center (emergency/non-emergency) for GPS and location based services. This feature can bypass anti-fraud capabilities normally in operation. Remote diagnostics/emissions can be disabled.

Figure 3:
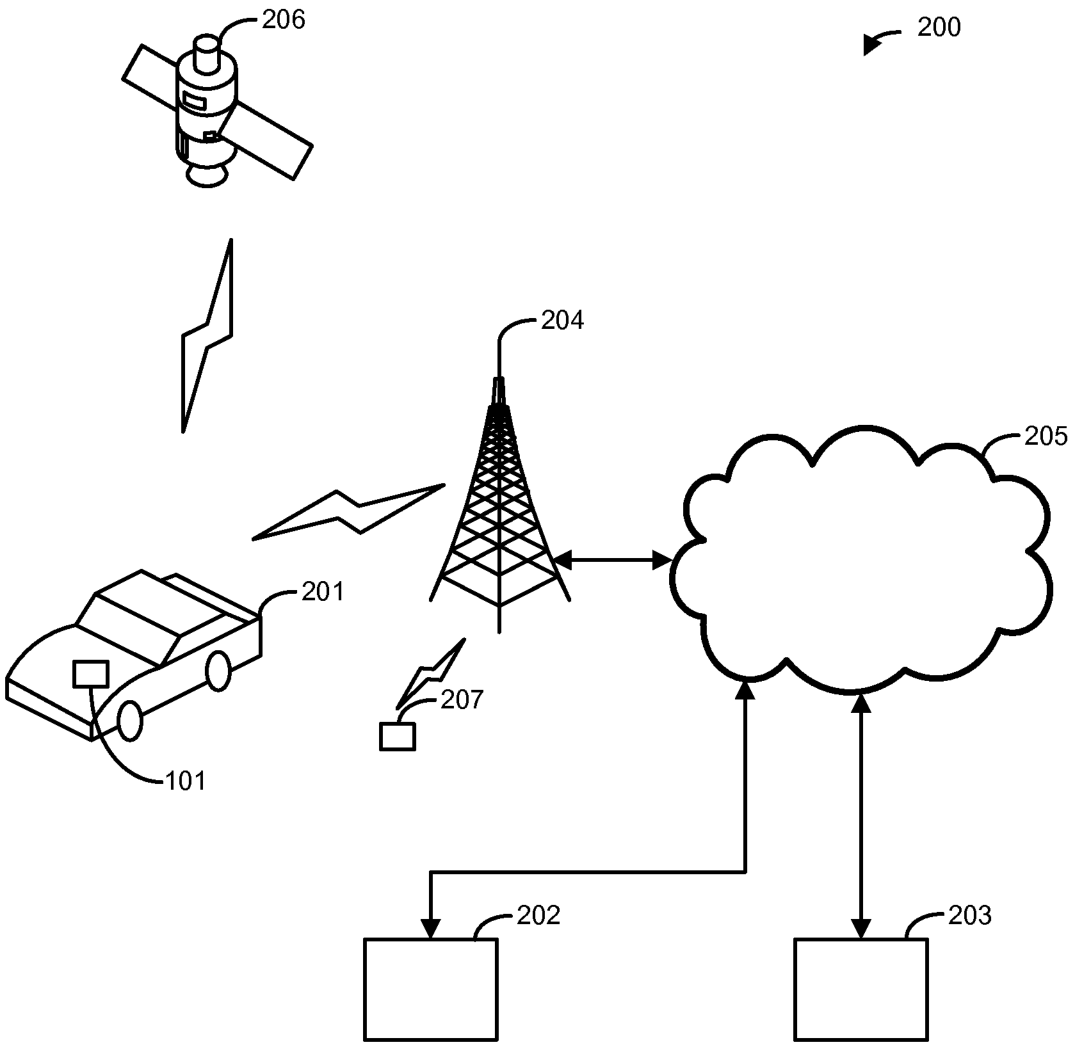
FIG. 3 is an exemplary system.

FIG. 3 is a block diagram illustrating an exemplary aftermarket telematics system 300 showing network connectivity between various components. The aftermarket telematics system 300 can comprise a consumer installed VTU 101 located in a motor vehicle 301. The aftermarket telematics system 300 can comprise a central monitoring station 302. The central monitoring station 302 can serve as a market specific data gatekeeper. That is, users 303 can pull information from specific, multiple or all markets at any given time for immediate analysis. The distributed computing model has no single point of complete system failure, thus minimizing aftermarket telematics system 300 downtime. In an embodiment, central monitoring station 302 can communicate through an existing communications network (e.g., wireless towers 304 and communications network 305). Aftermarket telematics system 300 can comprise at least one satellite 306 from which GPS data are determined. These signals can be received by a GPS receiver in the vehicle 301.

The aftermarket telematics system 300 can comprise a plurality of users 303 (companies, individuals, and the like) which can access aftermarket telematics system 300 using a computer or other such computing device, running a commercially available Web browser or client software. For simplicity, FIG. 3 shows only one user 303. The users 303 can connect to the aftermarket telematics system 300 via the communications network 305. In an embodiment, communications network 305 can comprise the Internet.

The aftermarket telematics system 300 can comprise a central monitoring station 302 which can comprise one or more central monitoring station servers. In some aspects, one or more central monitoring station servers can serve as the “back-bone” (i.e., system processing) of the aftermarket telematics system 300. One skilled in the art will appreciate that aftermarket telematics system 300 can utilize servers (and databases) physically located on one or more computers and at one or more locations. Central monitoring station server can comprise software code logic that is responsible for handling tasks such as data interpretations, statistics processing, data preparation and compression for output to VTU 101, and concierge, emergency, and non-emergency services for output to users 303. In an embodiment, user 303 can host a server (also referred to as a remote host) that can perform similar functions as a central monitoring station server. In an embodiment of the aftermarket telematics system 300, central monitoring station servers and/or remote host servers, can have access to a repository database which can be a central store for all information and vehicle performance data within the aftermarket telematics system 300 (e.g., executable code, subscriber information such as login names, passwords, etc., and vehicle and demographics related data). Central monitoring station servers and/or a remote host server can also provide a "front-end" for the aftermarket telematics system 300. That is, a central monitoring station server can comprise a Web server for providing a Web site which sends out Web pages in response to requests from remote browsers (i.e., users 303 or customers of users 303). More specifically, a central monitoring station server and/or a remote host server can provide a graphical user interface (GUI) "front-end" to users 303 of the aftermarket telematics system 300 in the form of Web pages. These Web pages, when sent to the user PC (or the like), can result in GUI screens being displayed.

Figure 4:
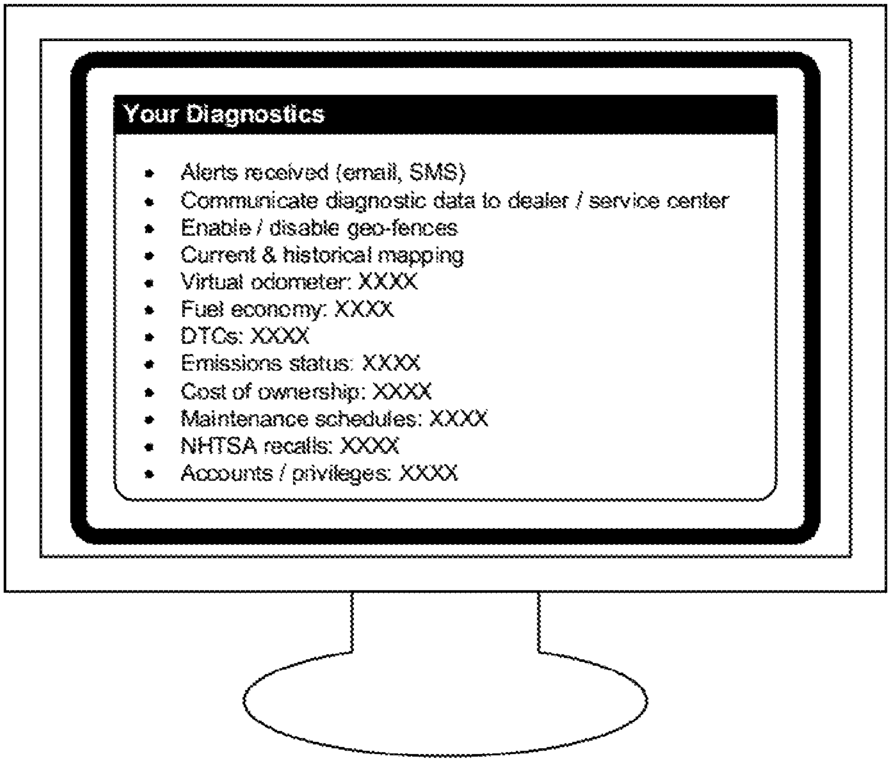
FIG. 4 is an exemplary user interface.

Provided is a dynamic means for presenting location and diagnostics data to consumers in a useful and attractive format. Users/consumers can actively monitor their vehicle's location, speed history, stop history, vehicle health, driving report, etc. . . . through a web-interface. Any or all of the data generated by the features described above including but not limited to, diagnostics and monitored driver behavior can be uploaded to the internet, stored for display on a web-site, and/or sent to the vehicle owner (or other approved party) via and e-mail or text message (SMS). An exemplary interface is illustrated in FIG. 4.

The website can have capabilities, including but not limited to, configuration of where/how to receive alerts (e-mail, SMS, etc.); permit & configure communication of diagnostic data to a dealer and/or service center; enable/disable/configure geo-fences; extensive mapping (current & historical); access to diagnostics & performance info such as virtual odometer, fuel economy, diagnostic trouble codes (DTC's), emissions status, cost of ownership calculator, and maintenance schedules; current National Highway Traffic Safety Administration (NHTSA) recalls; custom skins to alter the appearance of the website; control other user accounts/privileges (for example, spouse, children, etc. . . . ); push alert if unit is not responding (for example, if the unit is unplugged); the website can be configured for use with cellphones/PDA (i.e., views adapt to smaller screens); and interfaces can be provided between GPS data and 3$^{rd}$ party applications, such as route planning and mapping software.

In one aspect, an exemplary flow and operation of the aftermarket telematics system 300 can be as follows: After a pre-determined time interval (e.g., a time interval measured in days, hours, minutes, etc.) of monitoring and recording vehicle performance data, the VTU 101 can prepare stored vehicle performance data for transmission as one or more packets. A packet can be sent via a wireless link to central monitoring station 302 through communications network 305. There, the vehicle performance data can be processed (i.e., compiled and analyzed) by a server. In another embodiment, the vehicle performance data can be processed (i.e., compiled and analyzed) by the VTU 101 and processed data can be transmitted to central monitoring station 302. The processed performance data can then be made ready for distribution (i.e., reports generated by server) to users 303. The VTU 301 may be configured to transmit vehicle performance data collected from the vehicle with varying frequency (e.g., once every 5 minutes, twice a day, etc.). Such frequency can depend on factors such as the size of the memory of the VTU 101, bandwidth of the communications network 305, needs of the users 303, and the like.

In an aspect, the VTU 101 can transmit vehicle performance data upon a triggering event such as, but not limited to vehicle crash indication, acceleration above a threshold, speed above a threshold, and the like. VTU 101 transmission of vehicle performance data packets can be on any of a fixed time basis, fixed amount of data basis, or fixed event basis and can be downloadable from a central monitoring station server and/or website.

As described above, VTU 101 can communicate with one or more computers, either through direct wireless communication and/or through a network such as the Internet. Such communication can facilitate data transfer, voice communication, and the like. One skilled in the art will appreciate that what follows is a functional description of an exemplary computing device and that various functions can be performed by software, by hardware, or by any combination of software and hardware.

Figure 5:
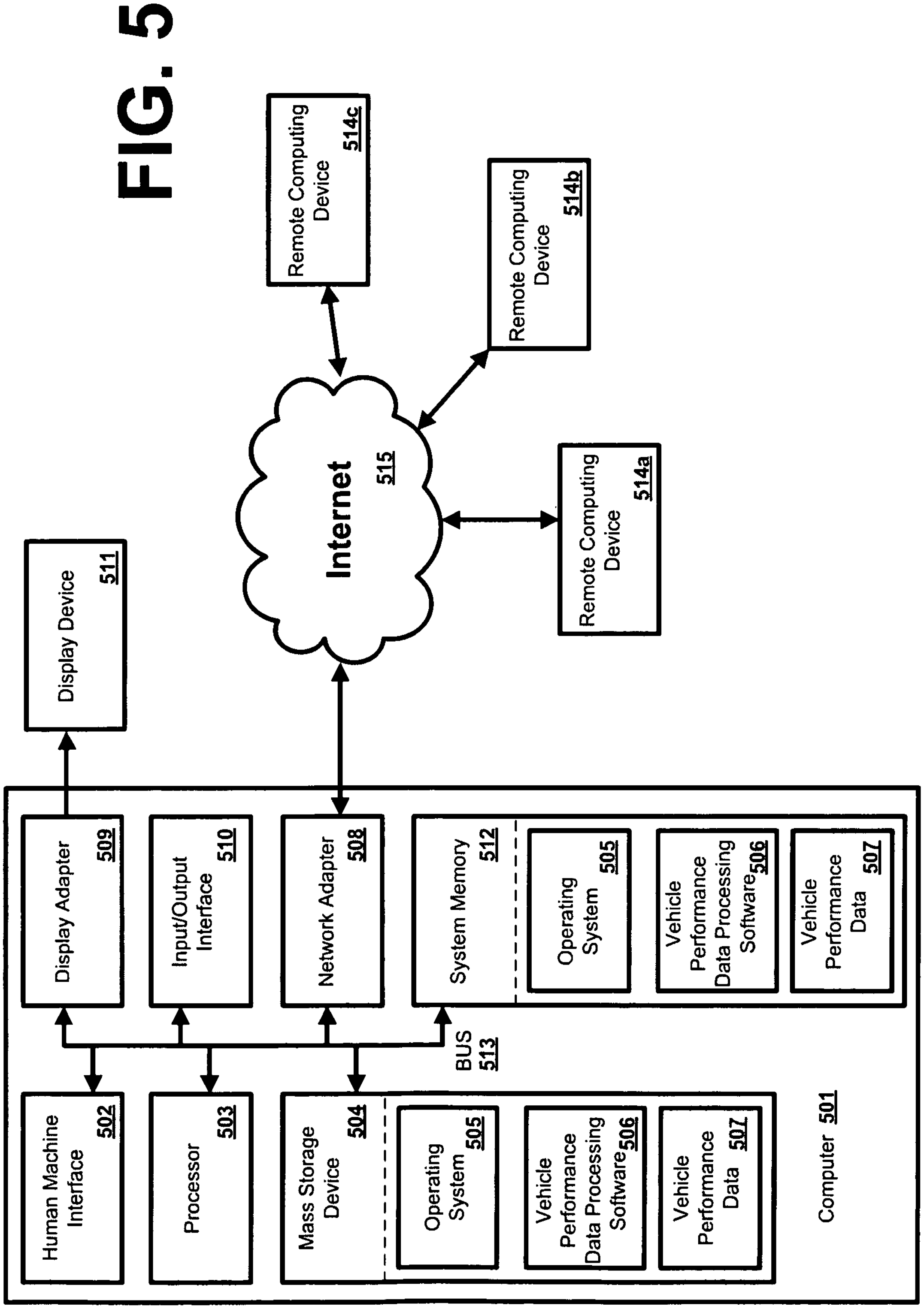
FIG. 5 is an exemplary operating environment for disclosed methods.

FIG. 5 is a block diagram illustrating an exemplary operating environment for performing the disclosed methods, for example, a server, or other computing device, at a remote host or a central monitoring station. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus, Universal Serial Bus (USB), and the like. The bus 513, and all buses specified in this description can also be implemented over a wired or wireless network connection and each of the subsystems, including the processor 503, a mass storage device 504, an operating system 505, telematics software 506, vehicle performance data 507, a network adapter (or communications interface) 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system. In one aspect, a remote computing device can be a VTU 101.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as vehicle performance data 507 and/or program modules such as operating system 505 and vehicle performance data processing software 506 that are immediately accessible to and/or are presently operated on by the processing unit 503. Vehicle performance data 507 can comprise any data generated by, generated for, received from, or sent to the VTU 101.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and vehicle performance data processing software 506. Each of the operating system 505 and vehicle performance data processing software 506 (or some combination thereof) can comprise elements of the programming and the vehicle performance data processing software 506. Vehicle performance data 507 can also be stored on the mass storage device 504. Vehicle performance data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices 514*a,b,c*. By way of example, a remote computing device can be a personal computer, portable computer, a server, a router, a network computer, a VTU 101, a PDA, a cellular phone, a "smart" phone, a wireless communications enabled key fob, a peer device or other common network node, and so on. Logical connections between the computer 501 and a remote computing device 514*a,b,c* can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. In one aspect, the remote computing device 514*a,b,c* can be one or more VTU 101's.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of vehicle performance data processing software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 6:
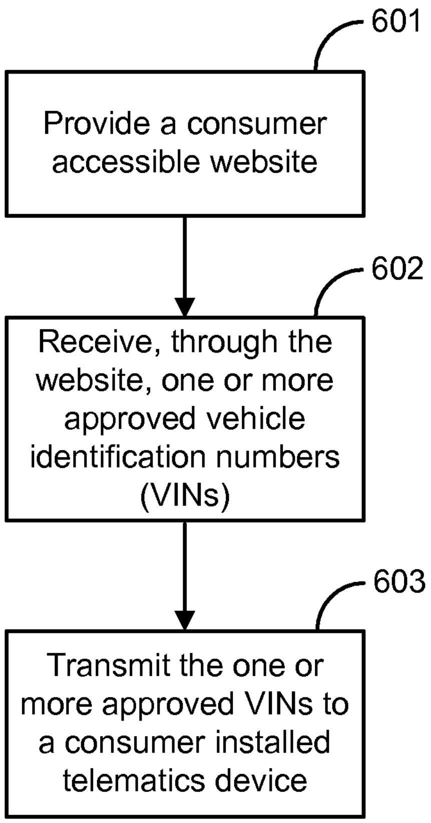
FIG. 6 is a flow diagram illustrating an exemplary method for aftermarket telematics.

In an aspect, illustrated in FIG. 6, provided are methods for aftermarket telematics comprising providing a consumer accessible website at 601, receiving, through the website, one or more approved vehicle identification numbers (VINs) at 602, and transmitting the one or more approved VINs to a consumer installed telematics device at 603.

The methods can further comprise receiving one or more approved features for each of the one or more approved VINs. The methods can further comprise receiving one or more geo-fences for the one or more approved VINs. The methods can further comprise receiving a default set of approved features for any VIN that is not an approved VIN.

Figure 7:
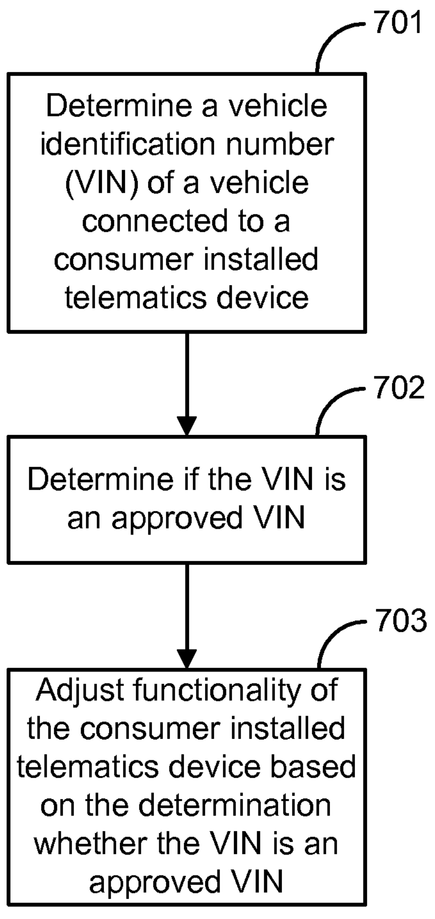
FIG. 7 is a flow diagram illustrating another exemplary method for aftermarket telematics.

In another aspect, illustrated in FIG. 7, provided are methods for aftermarket telematics comprising determining a vehicle identification number (VIN) of a vehicle connected to a consumer installed telematics device at 701, determining if the VIN is an approved VIN at 702, and adjusting functionality of the consumer installed telematics device based on the determination whether the VIN is an approved VIN at 703.

If the VIN is not an approved VIN, de-activating the consumer installed telematics device. If the VIN is an approved VIN, activating one or more of automatic crash notification, 911 services, location based services, navigation services, vehicle tracking services, geo-fencing services, and concierge services. If the VIN is not an approved VIN, activating stolen vehicle tracking.

Adjusting functionality of the consumer installed telematics device based on the determination whether the VIN is an approved VIN can comprise determining one or more approved features available and activating the one or more approved features.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods, systems, and apparatuses have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Figure 8:
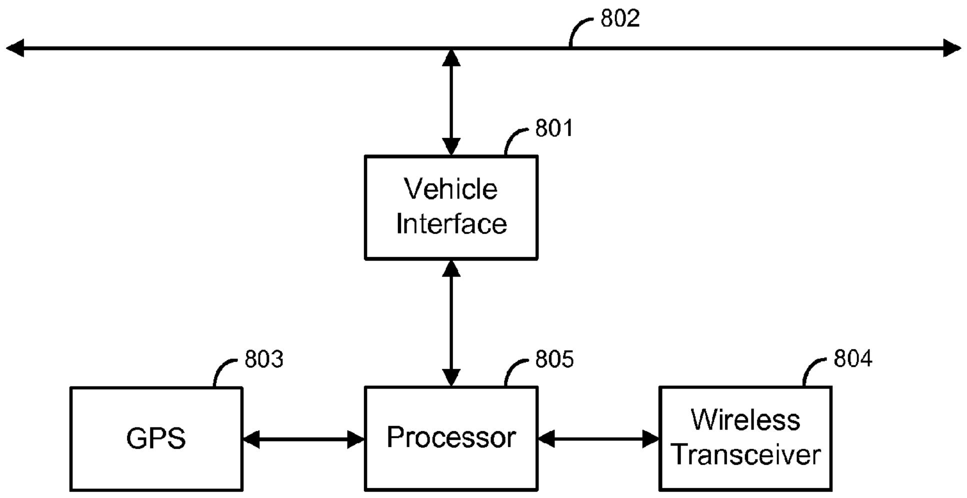
FIG. 8 is an exemplary apparatus.

In another aspect, illustrated in FIG. 8, provided is an apparatus for aftermarket telematics, comprising a vehicle interface 801, coupled to a vehicle bus 802, wherein the vehicle interface 801 is configured to receive vehicle performance data through the vehicle bus 802, a GPS receiver 803, configured for determining a vehicle location, a wireless transceiver 804, configured for transmitting the vehicle performance data and the vehicle location and for communication between a vehicle occupant and a central monitoring station, and a processor 805, coupled to the vehicle interface 801, the GPS receiver 803, and the wireless transceiver 804, wherein the processor 805 is configured for receiving the vehicle performance data and the vehicle location, for providing the vehicle performance data and the vehicle location to the wireless transceiver 804, and for managing communication between the vehicle occupant and the central monitoring station. The wireless transceiver 804 can be configured for transmitting data to a remote host, such as a central monitoring station and the like. The apparatus can be configured in various modalities for accomplishing the methods disclosed herein.

The apparatus can further comprise a microphone. The apparatus can further comprise a speaker. The apparatus can further comprise a display device. The vehicle interface can comprise an OBD cable. The wireless transceiver can be a cellular transceiver. The apparatus can be configured for providing emergency services and non-emergency services. The emergency services can comprise automatic crash notification and 911 services. The non-emergency services can comprise location based services, navigation services, vehicle tracking services, geo-fencing services, and concierge services. The apparatus can further comprise a third party interface. The third party interface can comprise one or more of, a serial port, a USB port, and a Bluetooth transceiver.

Figure 9:
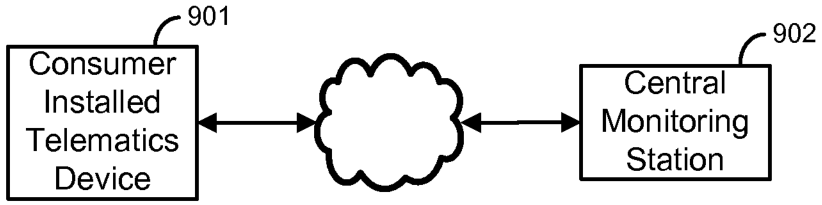
FIG. 9 is an exemplary system.

In another aspect, illustrated in FIG. 9, provided is a system for aftermarket telematics, comprising a consumer installed telematics device 901, configured for receiving vehicle performance data through a vehicle bus, receiving vehicle location data, transmitting the vehicle performance data and the vehicle location data, and for communication between a vehicle occupant and a central monitoring station 902 and a central monitoring station 902, configured for receiving the vehicle performance data and the vehicle location, for communication between the vehicle occupant and the central monitoring station 902, and for providing emergency and non-emergency services to a vehicle occupant. Communications between system components can be over a cellular network, an IP network, a satellite network and the like.

The consumer installed telematics device can comprise a microphone. The consumer installed telematics device can comprise a speaker. The consumer installed telematics device can comprise a display device. The consumer installed telematics device can comprise an OBD cable. The consumer installed telematics device can comprise a cellular transceiver. The emergency services can comprise automatic crash notification and 911 services. The non-emergency services can comprise location based services, navigation services, vehicle tracking services, geo-fencing services, and concierge services.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A portable telematics device for a vehicle, the portable telematics device comprising:

a vehicle interface configured to directly couple to a vehicle diagnostics port of the vehicle, the vehicle diagnostics port being coupled to a vehicle bus of the vehicle, and the vehicle interface being configured to receive vehicle performance data from the vehicle bus, via the vehicle diagnostics port;

a global positioning system (GPS) receiver configured to determine vehicle location data, the GPS receiver being activated when an ignition of the vehicle is turned on or when the vehicle starts moving, the GPS receiver being idle when the ignition of the vehicle is turned off or after the vehicle stops moving for a particular time period;

a wireless transceiver configured to:

transmit the vehicle performance data and the vehicle location data to a central monitoring station, and enable communication between a vehicle occupant and the central monitoring station; and a processor, coupled to the vehicle interface, the GPS receiver, and the wireless transceiver, and being configured to:

receive the vehicle performance data from the vehicle interface and the vehicle location data from the GPS receiver, provide the vehicle performance data and the vehicle location data to the wireless transceiver, manage the communication between the vehicle occupant and the central monitoring station, and control power supplied to the vehicle interface, the GPS receiver, and the wireless transceiver based on a plurality of power supply states, the processor, when controlling the power, being configured to selectively:

select a first state, of the plurality of power supply states, when the vehicle is operating, and cause power to be supplied to the vehicle interface, the GPS receiver, and the wireless transceiver during the first state, select a second state, of the plurality of power supply states, when on the telematics device is using battery backup, and cause power to be supplied to only the vehicle interface and the wireless transceiver during the second state, or select a third state, of the plurality of power supply states, when the vehicle is not operating, and prevent power from being supplied to the vehicle interface, the GPS receiver, and the wireless transceiver during the third state, the processor, the vehicle interface, the GPS receiver, and the wireless transceiver being contained within a single enclosure.

2. The portable telematics device of claim 1, further comprising a display device.

3. The portable telematics device of claim 1, wherein the vehicle interface comprises an on board diagnostics (OBD) cable.

4. The portable telematics device of claim 1, wherein the wireless transceiver is a cellular transceiver.

5. The portable telematics device of claim 1, wherein the processor is further configured to:

request one of emergency services or non-emergency services.

6. The portable telematics device of claim 5, wherein the emergency services include an automatic crash notification.

7. The portable telematics device of claim 5, wherein the non-emergency services comprise location based services, navigation services, geo-fencing services, and concierge services.

8. A system, comprising:

a portable telematics device that includes a vehicle interface, a global positioning system (GPS) receiver, a wireless transceiver, and a processor contained within a single enclosure, the vehicle interface being configured to directly couple to a vehicle diagnostics port of a vehicle, the vehicle diagnostics port being coupled to a vehicle bus of the vehicle, the vehicle interface being configured to receive vehicle performance data from the vehicle bus, via the vehicle diagnostics port, the GPS receiver being configured to determine a vehicle location data, the GPS receiver being activated when an ignition of the vehicle is turned on or when the vehicle starts moving, the GPS receiver being idle when the ignition of the vehicle is turned off or after the vehicle stops moving for a particular time period, the wireless transceiver being configured to transmit the vehicle performance data and the vehicle location data to a central monitoring station, and enable communication between a vehicle occupant and the central monitoring station, the processor being configured to:

receive the vehicle performance data from the vehicle interface, receive the vehicle location data from the GPS receiver, provide the vehicle performance data and the vehicle location data to the wireless transceiver, manage the communication between the vehicle occupant and the central monitoring station, and control power supplied to the vehicle interface, the GPS receiver, and the wireless transceiver based on a plurality of power supply states, the processor, when controlling the power, being configured to selectively:

select a first state, of the plurality of power supply states, when the vehicle is operating, and cause power to be supplied to the vehicle interface, the GPS receiver, and the wireless transceiver during the first state, select a second state, of the plurality of power supply states, when on the portable telematics device is using battery backup, and cause power to be supplied to only the vehicle interface and the wireless transceiver during the second state, or select a third state, of the plurality of power supply states, when the vehicle is not operating, and prevent power from being supplied to the vehicle interface, the GPS receiver, and the wireless transceiver during the third state, the central monitoring station being configured to:

receive the vehicle performance data and the vehicle location data from the portable telematics device, communicate with the vehicle occupant via the portable telematics device, and request emergency services or non-emergency services for the vehicle occupant.

9. The system of claim 8, wherein the portable telematics device further comprises a display device.

10. The system of claim 8, wherein the vehicle interface comprises an on board diagnostics (OBD) cable.

11. The system of claim 8, wherein the wireless transceiver comprises a cellular transceiver.

12. The system of claim 8, wherein the emergency services comprise an automatic crash notification or 911 services.

13. The system of claim 8, wherein the non-emergency services comprise one of location based services, navigation services, geo-fencing services, or concierge services.

14. The portable telematics device of claim 1, further comprising:
a microphone to:
receive an audio input from the vehicle occupant,
convert the audio input into an audio signal, and
provide the audio signal to the wireless transceiver for forwarding to the central monitoring station.

15. The portable telematics device of claim 1, further comprising:
a speaker to:
receive an audio signal from the central monitoring station, and
generate an audio output representative of the audio signal.

16. The system of claim 8, wherein the portable telematics device further comprises:
a microphone to:
receive an audio input from the vehicle occupant,
convert the audio input into an audio signal, and
provide the audio signal to the wireless transceiver for forwarding to the central monitoring station.

17. The system of claim 8, wherein the portable telematics device further comprises:
a speaker to:
receive an audio signal from the central monitoring station, and
generate an audio output representative of the audio signal.

18. The portable telematics device of claim 1, wherein the single enclosure is configured for installation in the vehicle.

19. A non-transitory computer-readable medium storing instructions, the instructions comprising:
one or more instructions that, when executed by a processor of a portable telematics device, cause the processor to:
receive vehicle performance data from a vehicle interface provided in the portable telematics device,
the vehicle interface being configured to directly couple to a vehicle diagnostics port of a vehicle,
the vehicle diagnostics port being coupled to a vehicle bus of the vehicle, and
the vehicle interface being configured to receive the vehicle performance data from the vehicle bus, via the vehicle diagnostics port;
receive vehicle location data from a global positioning system (GPS) receiver provided in the portable telematics device,
the GPS receiver being configured to determine the vehicle location data,
the GPS receiver being activated when an ignition of the vehicle is turned on or when the vehicle starts moving,
the GPS receiver being idle when the ignition of the vehicle is turned off or after the vehicle stops moving for a particular time period;
provide the vehicle performance data and the vehicle location data to a wireless transceiver provided in the portable telematics device,
the wireless transceiver being configured to transmit the vehicle performance data and the vehicle location data to a central monitoring station, and the wireless transceiver being configured to enable communication between a vehicle occupant and the central monitoring station;
manage the communication between the vehicle occupant and the central monitoring station,
the processor, the vehicle interface, the GPS receiver, and the wireless transceiver being contained within a single enclosure of the portable telematics device; and
control power supplied to the vehicle interface, the GPS receiver, and the wireless transceiver based on a plurality of power supply states,
the one or more instructions that cause the processor to control the power, cause the processor to selectively:
select a first state, of the plurality of power supply states, when the vehicle is operating, and cause power to be supplied to the vehicle interface, the GPS receiver, and the wireless transceiver during the first state,
select a second state, of the plurality of power supply states, when on the portable telematics device is user battery backup, and cause power to be supplied to only the vehicle interface and the wireless transceiver during the second state, or
select a third state, of the plurality of power supply states, when the vehicle is not operating, and prevent power from being supplied to the vehicle interface, the GPS receiver, and the wireless transceiver during the third state.

20. The non-transitory computer-readable medium of claim 19, where the vehicle interface comprises an on board diagnostics (OBD) cable.

* * * * *